(12) United States Patent
Grandblaise et al.

(10) Patent No.: US 8,306,547 B2
(45) Date of Patent: Nov. 6, 2012

(54) APPARATUS AND METHOD FOR RESOURCE SHARING BETWEEN A PLURALITY OF COMMUNICATION NETWORKS

(75) Inventors: David Grandblaise, Paris (FR); Remy Pintenet, Issy les Moulineaux (FR); Jean Christophe Dunat, Montrouge (FR)

(73) Assignee: Motorola Solutions, Inc., Schaumburg, IL (US)

( * ) Notice: Subject to any disclaimer, the term of this patent is extended or adjusted under 35 U.S.C. 154(b) by 815 days.

(21) Appl. No.: 11/917,797

(22) PCT Filed: Jun. 6, 2006

(86) PCT No.: PCT/US2006/021971
§ 371 (c)(1),
(2), (4) Date: Dec. 17, 2007

(87) PCT Pub. No.: WO2007/005182
PCT Pub. Date: Jan. 11, 2007

(65) Prior Publication Data
US 2008/0214200 A1   Sep. 4, 2008

(30) Foreign Application Priority Data
Jul. 4, 2005   (EP) .................................... 05291438

(51) Int. Cl.
*H04W 72/00* (2009.01)
*H04W 40/00* (2009.01)
(52) U.S. Cl. ...................... 455/452.2; 455/453; 455/447
(58) Field of Classification Search .............. 455/452.2, 455/453, 435.2, 447
See application file for complete search history.

(56) References Cited

U.S. PATENT DOCUMENTS
6,792,274 B1 *  9/2004  Kapanen ................. 455/450
(Continued)

FOREIGN PATENT DOCUMENTS
EP   1 742 497 B1   10/2008
WO   WO0223758 A1   3/2002

OTHER PUBLICATIONS

Chinese Examiner, "(Notice of Allowance) Notification on the Grant of Patent Right for Invention," Patent Office of the People's Republic of China, Beijing, China, Jan. 22, 2010, 4 pages, most relevant pp. 1-2.

(Continued)

*Primary Examiner* — Kent Chang
*Assistant Examiner* — Scott Au
(74) *Attorney, Agent, or Firm* — Kenneth Haas; Barbara R. Doutre (57) ABSTRACT

An apparatus for resource sharing between a plurality of communication networks (103, 107, 111) each having a nominal resource allocation of a shared air interface resource and a resource exchange allowance is provided. The apparatus (201) comprises a sharing instigation processor (205) which initiates a temporary resource allocation of a first air interface resource from a nominal resource allocation of a first network (103). A network interface (201) receives offer messages from a plurality of networks (107, 111). Each offer message comprises a resource exchange offer value for at least part of the first air interface resource. A selection processor (207) selects a second network (107) for example by selecting the highest offer value for a given resource. An allocation message generator (211) transmits a resource allocation message to the second network (107) indicating a temporary allocation of at least part of the first air interface resource. The resource exchange allowance of the second network (107) is then reduced by a value corresponding to the resource exchange offer value from the second network (107).

7 Claims, 4 Drawing Sheets

U.S. PATENT DOCUMENTS

| | | | |
|---|---|---|---|
| RE38,787 E | | 8/2005 | Sainton et al. |
| 7,436,788 B2 * | | 10/2008 | Huschke et al. ............... 370/310 |
| 2002/0052914 A1 * | | 5/2002 | Zalewski et al. ............... 709/203 |
| 2002/0137518 A1 * | | 9/2002 | Achour .......................... 455/447 |
| 2002/0181462 A1 | | 12/2002 | Surdila et al. |
| 2004/0166835 A1 | | 8/2004 | Johansson et al. |
| 2005/0128971 A1 | | 6/2005 | Huschke et al. |
| 2005/0221795 A1 | | 10/2005 | Hirabe et al. |
| 2005/0260997 A1 | | 11/2005 | Korale et al. |
| 2006/0083205 A1 | | 4/2006 | Buddhikot et al. |
| 2006/0142018 A1 | | 6/2006 | Matz et al. |

OTHER PUBLICATIONS

Ellen Moyse, "PCT/US2006/021971—PCT International Preliminary Report on Patentability," The International Bureau of WIPO, Geneva, Switzerland, Jan. 17, 2008.

Jacqueline A. Whitfield, "PCT/US2006/021971—PCT International Search Report and Written Opinion," WIPO, ISA/US, Commissioner for Patents, Alexandria, VA, USA, Jun. 12, 2007.

Larcinese, "European Search Report," European Patent Office, Rijswijk, Netherlands, Feb. 27, 2006.

Primary Examiner, "Communication under Rule 71(3) EPC, Grant Decision," European Patent Office, Rijswijk, Netherlands, May 30, 2008.

Primary Examiner, "European 1st Office Action," European Patent Office, Rijswijk, Netherlands, Aug. 20, 2007.

Examiner, "Notification of the First Office Action," The State Intellectual Property Office of the People's Republic of China, Sep. 11, 2009. (with Translation).

Grandblaise, et al., "Credit Token based Rental Protocol for Dynamic Channel Allocation," IEEE 1-4244-0381, Feb. 2006, 5 pages, especially sections III and IV.

* cited by examiner

APPARATUS AND METHOD FOR RESOURCE SHARING BETWEEN A PLURALITY OF COMMUNICATION NETWORKS

FIELD OF THE INVENTION

The invention relates to resource sharing between a plurality of communication networks and in particular, but not exclusively, to temporary air interface resource re-allocation between cellular communication systems.

BACKGROUND OF THE INVENTION

In the last decades, wireless communication systems have become ubiquitous. For example, cellular communication systems and wireless Local Area Networks (LANs) have become widespread as a means for providing efficient communication services to e.g. mobile communication units. However, the increased prevalence of wireless communication systems have resulted in a dramatically increased need for air interface resources and the need for efficiently and flexibly utilising the available resource has become essential for the further development of wireless systems.

A method that has been proposed for effectively increasing the utilisation of air interface resource is spectrum sharing wherein a number of independent networks may share the same frequency spectrum. The frequency spectrum may be shared by time division wherein the individual networks are allocated distinct time intervals for transmission.

However, a static allocation of resource to different networks will typically not result in an optimal utilisation of the available resource as the resource requirements for individual networks tend to vary dynamically. However, current approaches for dynamic allocation of a shared air interface resource to individual networks tend to be complex, result in suboptimal resource sharing and suboptimal performance for the individual networks.

Hence, an improved system for resource sharing would be advantageous and in particular a system allowing increased flexibility, improved resource sharing, improved dynamic performance, reduced complexity and/or improved resource sharing would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus for resource sharing between a plurality of communication networks each having a nominal resource allocation of a shared air interface resource and a resource exchange allowance, the apparatus comprising: initiating means for initiating a temporary resource allocation of a first air interface resource from a nominal resource allocation of a first network; means for receiving offer messages from a plurality of networks; each offer message comprising a resource exchange offer value for at least part of the first air interface resource; means for selecting a second network in response to the received resource exchange offer values; means for sending a resource allocation message to the second network, the resource allocation message indicating a temporary allocation of at least part of the first air interface resource from the first network to the second network; and means for reducing the resource exchange allowance of the second network by a value determined in response to the resource exchange offer value from the second network.

The invention may allow improved resource sharing between different networks. An efficient management of resource sharing may be achieved. All or some of the nominal resource allocation for one network may temporarily be reassigned to another network (or to a plurality of other networks) without necessitating a complex and/or combined resource allocation. The invention may e.g. allow a temporary resource re-allocation to the network requiring it most through a simple offer mechanism. An efficient dynamic resource sharing is enabled while maintaining the required interworking and coordination between the communication networks low.

Different communication networks may employ independent resource allocation of the allocated air interface allocation and may be independently managed and controlled. The individual networks may be owned and operated by different and independent operators. The communication networks may for example be cellular communication systems such as the Global System for Mobile (GSM) communication or the Universal Mobile Telecommunication System (UMTS). The communication networks may for example also be Orthogonal Frequency Division Multiple Access systems. For example, the communication networks may include Wireless Local Area Networks (WLANs) such as IEEE 802.11 networks or broadband wireless radio access systems such as IEEE 802.16 networks. The invention may in some embodiments provide a cognitive radio based solution to spectrum utilisation and may in particular allow spectrum reuse opportunities by providing the means to identify/detect the free/available resources for sharing.

The invention may in some embodiments enable or facilitate spectrum sharing in a distributed and real time way. In particular, it may provide the mechanisms for spectrum sharing between base stations using a peer-to-peer arrangement.

The invention may in some embodiments enable or facilitate co-existence of heterogeneous radio access systems using the same frequency band based on collaborative mechanisms.

The invention may e.g. be applied to communication networks using Time Division Duplex (TDD) or Frequency Division Duplex (FDD) communication schemes.

According to an optional feature of the invention, the apparatus further comprises means for increasing a resource exchange allowance of the first network by a value determined in response to the resource exchange offer value of the second network.

The resource exchange allowance of the first network may specifically be increased by the same amount that the resource exchange allowance of the second network is reduced. The feature may allow an effective sharing of resource and may provide a suitable incentive for networks to share any available resource for the benefit of other networks.

According to an optional feature of the invention, the initiating means is arranged to initiate the temporary resource allocation in response to a determination of an available resource of the nominal resource allocation for the first network.

This may allow an efficient resource sharing and/or a practical detection of when resource sharing may be beneficial and/or practical. The instigation of the temporary resource allocation may for example be by the first network transmitting a notification of the availability of resource to other networks.

The temporary resource allocation may be instigated by the first network, for example in response to a determination that some of the nominal resource allocation is not used. The available resource may for example be unused resource or a resource used for low priority communications.

According to an optional feature of the invention, the initiating means is arranged to initiate the temporary resource allocation in response to a determination of a resource requirement for the second network.

This may allow an efficient resource sharing and/or a practical detection of when resource sharing may be beneficial and/or practical. The instigation of the temporary resource allocation may for example be by the second network transmitting a notification to other networks indicating a requirement or request for additional resource.

The temporary resource allocation may be instigated by the second network for example in response to a determination that the nominal resource allocation of the second network is insufficient to accommodate the desired communication services.

According to an optional feature of the invention, the selection means is arranged to select the second network in response to a determination that the resource exchange offer value from the second network for the at least part of the first air interface resource is the highest received resource exchange offer value.

The selection means may for example select the network to which a given resource is temporarily re-allocated as the network providing the highest offer for that specific resource. This may provide a simple and efficient way of providing the available resource to networks most in need of the resource, and may in some embodiments assist in the maximisation of the benefit to the first network of sharing this resource.

According to an optional feature of the invention, the shared air interface resource is a frequency band and the first air interface resource comprises all frequency carriers in the frequency band.

This may provide for a simple sharing of resource which may provide efficient performance and which typically may reduce the impact of the sharing of resource on the first network and/or the second network.

According to an optional feature of the invention, the at least part of the first air interface resource corresponds to the frequency band in a time interval. This may facilitate efficient resource sharing.

According to an optional feature of the invention, the shared air interface resource is a frequency band and the first air interface resource comprises only a subset of frequency carriers in the frequency band.

This may allow for a more flexible resource sharing and may allow a lower granularity resource sharing.

According to an optional feature of the invention, the apparatus further comprises means for determining a service impact of allocating the at least part of the first air interface resource to a prospective network and the selection means is arranged to select the prospective network as the second network only if the service impact meets a criterion.

This may allow improved performance (e.g. in term of a quality of service (QoS) Guarantee) and may assist in ensuring compatibility between the operation of the first and second networks when temporary reallocating resource. The criterion may be a suitable co-existence criterion. For example, the criterion may be a criterion requiring that a certain Quality of Service level is maintained in the first and/or second network.

According to an optional feature of the invention, the service impact is a service impact on the prospective network. This may assist in ensuring a suitable performance for communication services of the network potentially receiving the temporary resource allocation.

According to an optional feature of the invention, the service impact is a service impact on the first network. This may assist in ensuring a suitable performance for communication services of the first network.

According to an optional feature of the invention, the selection means is arranged to select a plurality of selected networks and to allocate different parts of the first air interface resource to the plurality of selected networks so as to maximise the combined resource exchange offer values.

This may allow a flexible resource allocation wherein an available resource is shared between a plurality of networks in accordance with their respective need for the resource, and may in some embodiments maximise the benefit to the first network of sharing the resource.

According to an optional feature of the invention, the resource exchange offer value is for a predetermined resource unit.

This may allow a more flexible resource sharing and/or may facilitate the management operations for the resource sharing. The resource exchange offer value may for example be an offer value for a resource unit such as for one carrier for a certain duration or for the whole frequency band for a certain duration. A total resource exchange offer value for the part of the first air interface resource may then be determined by multiplying the resource exchange offer value and the number of resource units in the part of the first air interface resource.

According to an optional feature of the invention, the plurality of communication networks employs a shared Media Access Control (MAC) frame and wherein each of the plurality of communication networks has a nominal allocated time interval.

This may facilitate resource sharing and may provide compatibility with many existing communication systems, such as for example the IEEE 802.16 and 802.11 communication network families. The nominal resource allocation for a network may correspond to a time interval of the MAC frame nominally allocated to that network.

According to an optional feature of the invention, the selection means is arranged to select the second network in response to an iterative selection process comprising a plurality of resource exchange offer values being received from at least the second network.

This may allow an improved selection and may in some embodiments assist in the maximisation of the benefit to the first network of sharing this resource.

According to an optional feature of the invention, the selection means is arranged to only select the second network if the resource exchange offer value of the second network exceeds a threshold.

This may ensure that the temporary resource sharing is only performed if the desire from other networks is sufficiently high and in some embodiments may ensure that the temporary resource sharing is only performed if the benefit to the first network is sufficiently high.

According to a second aspect of the invention, there is provided a communication system comprising a plurality of communication networks each having a nominal resource allocation of a shared air interface resource and a resource exchange allowance, the communication system comprising: initiating means for initiating a temporary resource allocation of a first air interface resource from a nominal resource allocation of a first network; means for receiving offer messages from a plurality of networks; each offer message comprising a resource exchange offer value for at least part of the first air interface resource; means for selecting a second network in response to the received resource exchange offer values;

means for sending a resource allocation message to the second network, the resource allocation message indicating a temporary allocation of at least part of the first air interface resource from the first network to the second network; means for reducing the resource exchange allowance of the second network by a value determined in response to the resource exchange offer value from the second network; and means, in the second network, for communicating using the at least part of the first air interface resource.

According to an optional feature of the invention, the communication system further comprises means for storing the resource exchange allowances of the plurality of communication networks, and the means for reducing the resource exchange allowance of the second network is arranged to transmit a message comprising the resource exchange offer value of the second network to the means for storing, and the means for storing is arranged to update the resource exchange allowance for the second network in response to the message.

This may facilitate the control of the resource sharing and may provide a practical and reliable means for managing and monitoring the resource exchange allowance of different networks. The means for storing the resource exchange allowances may for example be a central server and associated databases coupled to the plurality of networks.

According to a third aspect of the invention, there is provided a method of resource sharing between a plurality of communication networks each having a nominal resource allocation of a shared air interface resource and a resource exchange allowance, the method comprising: initiating a temporary resource allocation of a first air interface resource from a nominal resource allocation of a first network; receiving offer messages from a plurality of networks; each offer message comprising a resource exchange offer value for at least part of the first air interface resource; selecting a second network in response to the received resource exchange offer values; sending a resource allocation message to the second network, the resource allocation message indicating a temporary allocation of at least part of the first air interface resource from the first network to the second network; and reducing the resource exchange allowance of the second network by a value determined in response to the resource exchange offer value from the second network.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to cellular communication networks such as GSM or UMTS cellular communication systems but it will be appreciated that the invention is not limited to this application but may be applied to many other communication networks such as for example the IEEE 802.16 and 802.11 communication network families.

Figure 1:
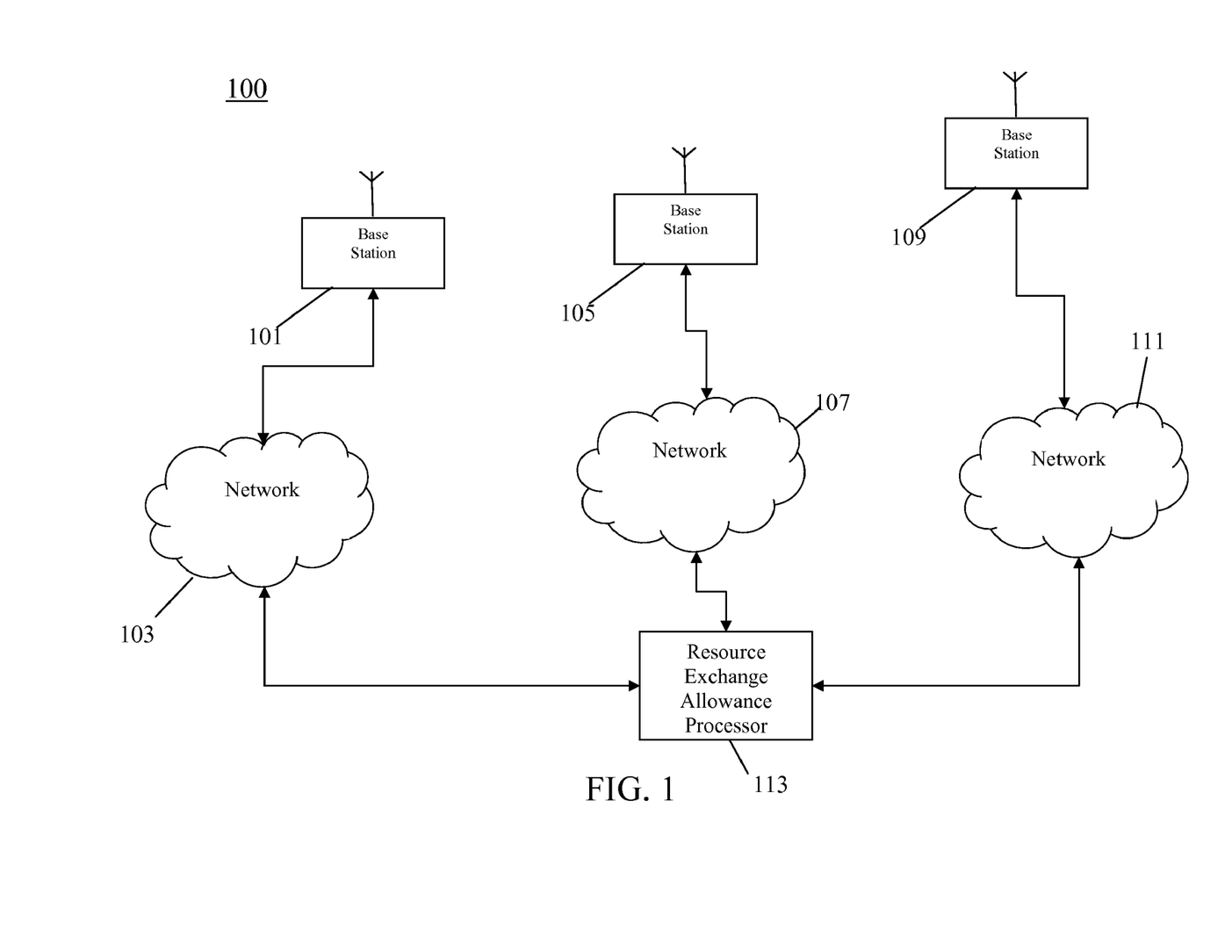
FIG. 1 illustrates an example of a combined communication system arrangement comprising three communication networks in accordance with some embodiments of the invention.

FIG. 1 illustrates an example of a combined communication system arrangement comprising three different individual communication systems or networks 103, 107, 111 (the terms communication system and network are used interchangeably).

Each of the networks 103, 107, 111 comprises all the required functionality for supporting communication services in accordance with the Technical Specifications of the communication system. In the specific example, the networks 103, 107, 111 comprise functionality for supporting communications over a cellular air interface. Thus, in particular each network 103, 107, 111 comprises at least one base station 101, 105, 109 which can transmit and receive signals over the air interface of the individual communication system (for clarity the base stations 101, 105, 109 are shown coupled to the networks 103, 107, 111 in FIG. 1)

In the example of FIG. 1, the three networks 103, 107, 111 employ spectrum sharing wherein the same frequency spectrum is used by the air interface communications of all three networks 103, 107, 111. In the specific example, the three networks use time division such that the three networks 103, 107, 111 have access to the full frequency spectrum at different times.

Specifically, the three networks are arranged to use the same MAC (Media Access Control) frame structure on the air interface. The networks 103, 107, 111 are furthermore synchronised such that the MAC frames for transmissions over the air interface are frame synchronised.

In the example, each of the networks is allocated a nominal resource allocation corresponding to a specified time interval in each frame. Specifically, the downlink (forward link) and uplink (reverse link) MAC frames are divided into three time intervals of equal size with one time interval being allocated to each of the networks 103, 107, 111.

Thus, within an allocated time interval, the appropriate network 103, 107, 111 is free to communicate over the air interface but this is not allowed during the time intervals allocated to other networks 103, 107, 111.

Figure 2:
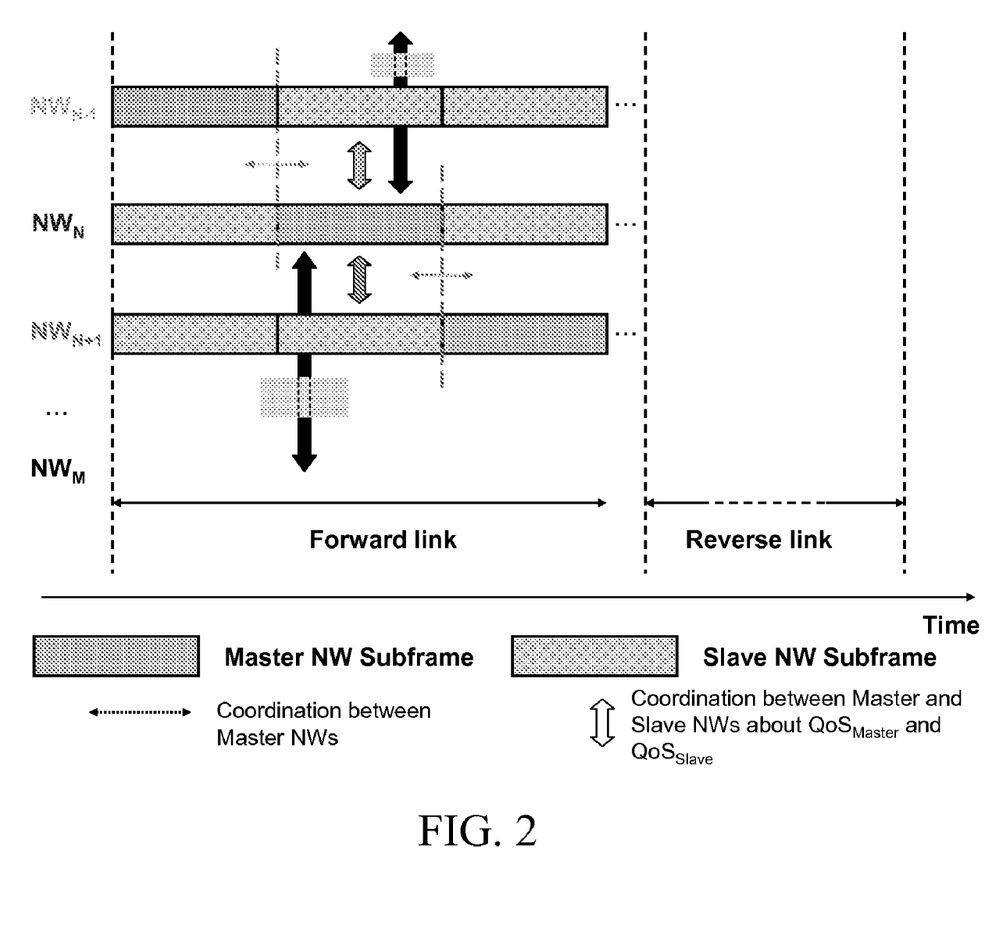
FIG. 2 illustrates an example of a Time Division Duplex frame structure for a plurality of networks using spectrum sharing.

FIG. 2 illustrates an example of a frame structure for a plurality of networks 103, 107, 111 using spectrum sharing. In the example, for each time interval, the network 103, 107, 111 which is nominally allocated the resource is denoted the master network and the other networks are denoted slave networks.

The individual networks 103, 107, 111 independently manage and control the operation of the networks. Specifically, each of the networks is at any time allocated a given air interface resource and the management of this air interface resource allocation is performed without any consideration of the operation of the other networks 103, 107, 111. Thus, specifically, the allocation of resource to individual calls and base stations in the individual network 103, 107, 111 is performed with consideration of the allocated resource but without consideration of how other communication systems are managing the resource allocated to them.

Although spectrum sharing may allow an efficient sharing of resource, a static allocation is inefficient as it may not take into account the dynamic and different resource requirements of the individual networks 103, 107, 111.

In the system of FIG. 1, the resource sharing of the common frequency band may be improved by a temporary resource allocation of resource from the nominal resource allocation of one network to another network.

In the system, each of the networks 103, 107, 111 is allocated a resource exchange allowance which may be used when borrowing resource from another network. In the system, a resource may temporarily be allocated from one network to another. In response, the resource exchange allowance of the network receiving the resource will be reduced whereas the resource exchange allowance of the network providing the resource is increased.

The communication system of FIG. 1 specifically comprises a resource exchange allowance processor 113 which stores the resource exchange allowances of the networks 103, 107, 111. The stored resource exchange allowances are updated when resource is temporarily re-allocated and thus the resource exchange allowance provides an indication of the resource the individual has borrowed to or from other communication networks.

Figure 3:
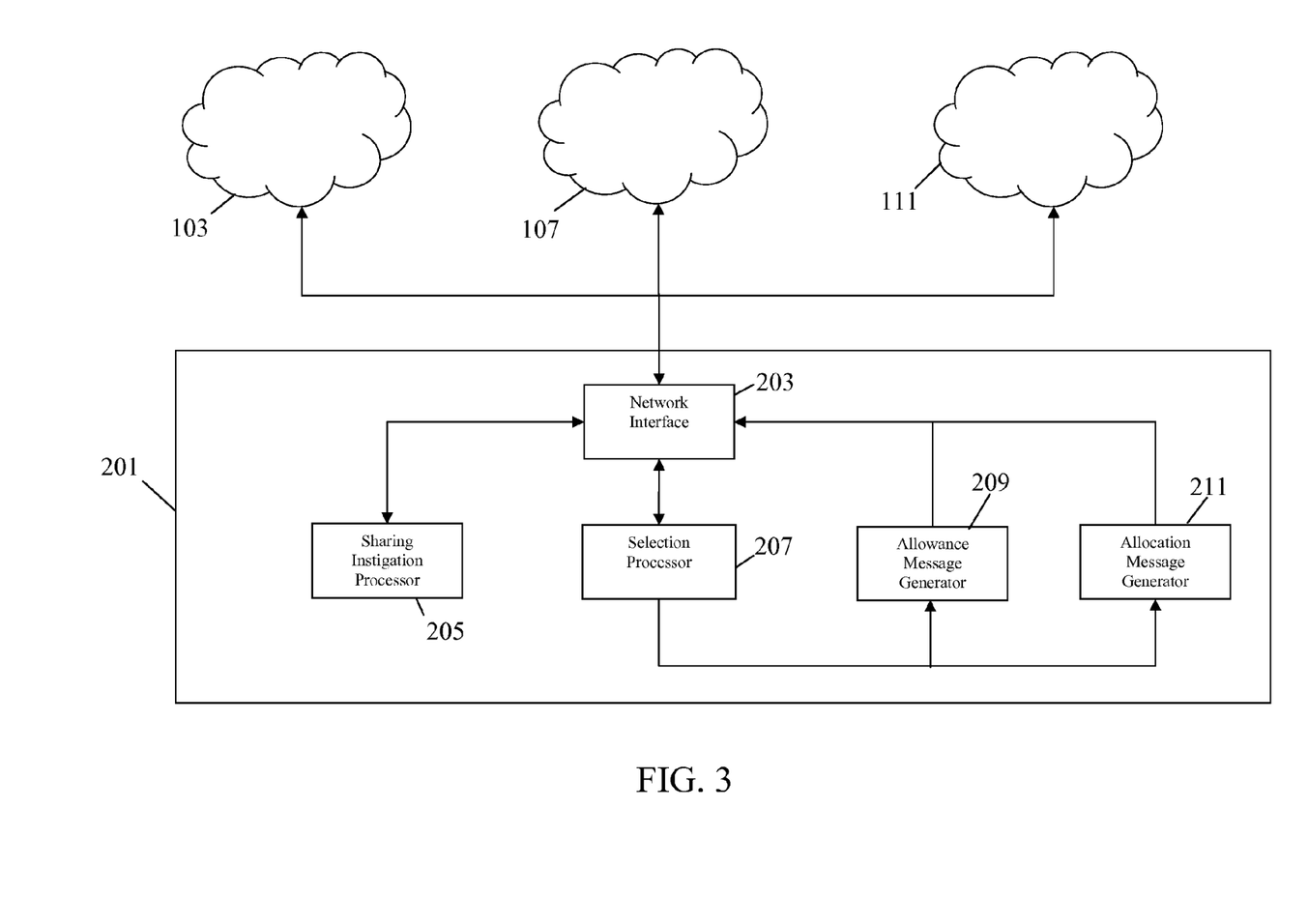
FIG. 3 illustrates an example of an apparatus for resource sharing in accordance with some embodiments of the invention.

FIG. 3 illustrates an example of an apparatus for resource sharing in accordance with some embodiments of the invention. The apparatus may be implemented in any suitable location and/or may be distributed between different locations and between different networks. For example, the apparatus may be implemented in one or more of the networks 103, 107, 111 and/or in the resource exchange allowance processor 113. Specifically, the MAC resource allocation processors of the different networks 103, 107, 111 may comprise an apparatus as illustrated in FIG. 3.

The apparatus 201 comprises a network interface 203 which interfaces to the different networks 103, 107, 111. It will be appreciated that in some embodiments where e.g. the apparatus 201 is implemented in a network element of one of the networks 103, 107, 111, the network interface 203 may be coupled to one or more network elements of that network and through this network to the other networks. As another example, the network interface 203 may be directly coupled to the resource exchange allowance processor 113. In the following, the description will focus on an example wherein the apparatus 201 is part of the first network 103.

The apparatus 201 further comprises a sharing instigation processor 205 which is coupled to the network interface 203. The sharing instigation processor 205 is arranged to initiate a temporary resource allocation of a first air interface resource from a nominal resource allocation of the first network.

For example, the sharing instigation processor 205 may detect that the first network 103 has spare resource that is not used and which it may allow other networks to use. In response, the sharing instigation processor 205 may generate resource availability messages which are transmitted to other networks through the network interface 203.

In response, the network interface 203 may receive offer messages from the other networks 205, 209. Each offer message will comprise a resource exchange offer value for at least some of the resource available for sharing. The resource exchange offer value is indicative of an amount of reduction in its resource exchange allowance that the network transmitting the offer message is willing to accept in return for a temporary allocation of the specified resource.

The apparatus 201 further comprises a selection processor 207 which is coupled to the network interface 203 and is fed the received resource exchange offer values. In response, the selection processor 207 proceeds to select a specific network to which the given resource is to be temporarily re-allocated. It will be appreciated that resource may be allocated to a plurality of other networks in many embodiments.

For example, for a given resource, the selection processor 207 may simply select the network which has the highest resource exchange offer value, i.e. to the network which is willing to accept the highest reduction in its resource exchange allowance. As this reduction may be seen as a penalty value for the temporary borrowing of resource, the selection processor 207 may automatically select the network which is most in need of the available resource and thus an efficient resource sharing may be achieved through a low complexity system.

The resource exchange offer values may be an offer value for a given unit of resource. For example, the received resource exchange offer values may specify an amount of reduction in the resource exchange allowance the specific network is willing to accept for the allocation of a single carrier in each time interval of, say, $1/100^{th}$ of the MAC frame duration. The total offer values compared by the selection processor 207 may in such a case be determined by multiplying the specific offer value with the number of carriers and the number of time intervals of the resource that may be allocated.

The selection processor 207 is coupled to an allowance message generator 209 which is further coupled to the network interface 203 and which is arranged to transmit an allowance message to the resource exchange allowance processor 113 causing the resource exchange allowance for the selected network to be reduced. Specifically, the allowance message generator 209 may calculate a resource exchange allowance reduction in response to the resource exchange offer value and send this value to the resource exchange allowance processor 113. Thus, the allowance message generator 209 causes the resource exchange allowance of the second network to be reduced by a value determined in response to the resource exchange offer value from the second network.

If the resource exchange allowance processor 113 identifies that the resource exchange allowance of the network receiving the temporary allocation falls below zero, it may notify the apparatus 201 of this fact. In response, the apparatus 201 will prevent the reallocation of resource to this network.

The selection processor 207 is further coupled to an allocation message generator 211 which is further coupled to the network interface 203 and which is arranged to transmit a resource allocation message to the selected network. The resource allocation message comprises an indication of the temporary allocation of at least part of the available resource. Following receipt of the resource allocation message, the selected network may proceed to use the borrowed resource. Specifically, air interface transmission in a re-allocated time interval nominally allocated to the first network 103 may be scheduled in the selected network.

Figure 4:
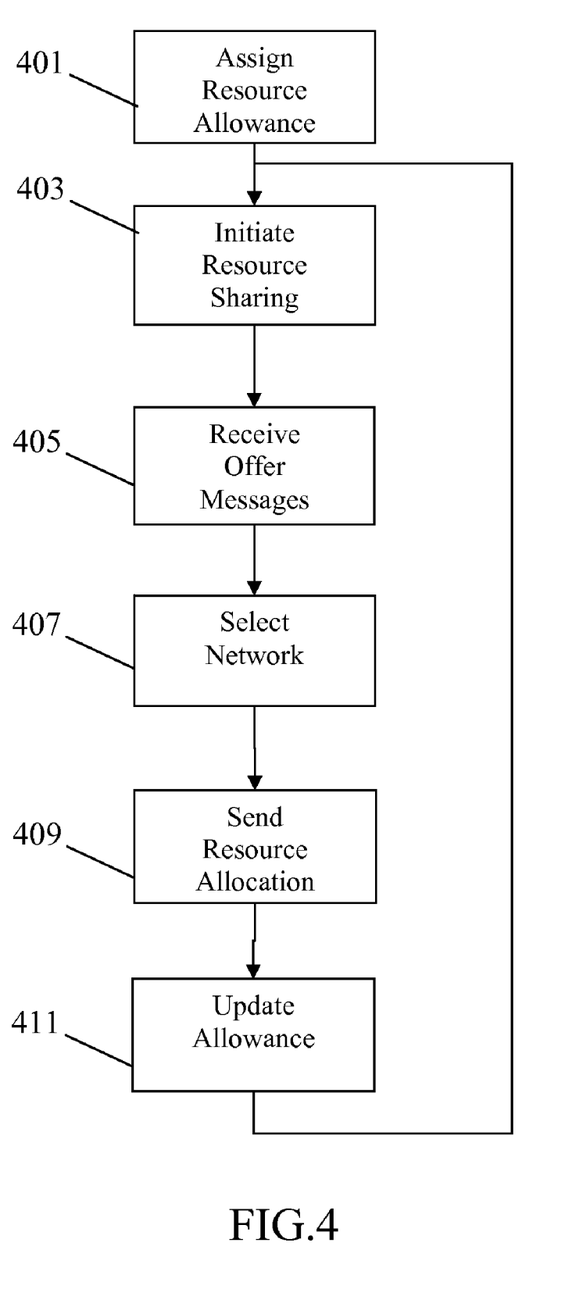
FIG. 4 illustrates an example of a method for resource sharing in accordance with some embodiments of the invention.

FIG. 4 illustrates an example of a method for resource sharing in accordance with some embodiments of the invention. The method will be described with reference to the apparatus of FIG. 3.

The method initiates in step 401 wherein the resource exchange allowance processor 113 is initialised with a resource exchange allowance for each network 103, 107, 111. In the following exemplary description, the resource exchange allowance will be measured in an arbitrary unit referred to as a credit token. The resource exchange allowance processor 113 may for example be initialised with each network 103, 107, 111 being allocated a predetermined amount of credit tokens.

It will be appreciated that the resource exchange allowance for individual networks may be changed in accordance with other mechanisms. For example, the individual network operators may be able to increase their resource exchange allowance, for example after this having been reduced to an undesirable level by borrowing of resource, in return for a payment. For example, the network operators may have agreed that credit tokens can be bought at a specific price.

Step 401 is followed by step 403 wherein a temporary resource allocation of an air interface resource from the nominal resource allocation of a network is initiated.

The initiation may be initiated by the network seeking to temporarily lend resource or may be initiated by a network seeking to borrow resource.

For example, as previously described, the sharing instigation processor 205 may detect that some resource is not used in the first network 103 or that some resource is only used by low priority services and that it would be desirable to temporarily re-allocate this resource in return for credit tokens. The sharing instigation processor 205 may accordingly send out messages indicating that resource is available to be shared.

As a specific example, the first network 103 may send a resource availability message indicating that the frequency band is available from starting time $T_{start}$ to ending time $T_{end}$ ($T_{end} - T_{Start} = T_{Renting}$) This time interval will thus make the time frame interval allocated to the first network 103 available to other networks for a fraction of the duration. The first network 103 may in addition include an indication of a minimum number of credit tokens required per time interval for the first network 103 to be willing to temporarily reallocate the resource.

As another example, a network may detect that it needs more resource than is currently available in order to support the desired services. Accordingly, the network may initiate a temporary resource allocation by transmitting resource request messages.

E.g. in an example where the resource sharing apparatus 201 is implemented in the resource exchange allowance processor 113, a network interested in borrowing resource may transmit a resource request message to the resource exchange allowance processor 113. The resource exchange allowance processor 113 may then transmit resource requests to other networks which may in return transmit indications of an available resource, or may indeed themselves return a resource request. The resource exchange allowance processor 113 may then proceed to allocate the available resource between the requesting networks in accordance with the described principles.

Step 403 is followed by step 405 wherein offer messages are received from a plurality of networks. The offer messages may specifically indicate a number of credit tokens offered per resource unit, such as the number of credit tokens per time interval and/or per carrier.

Specifically, in response to receiving the resource availability message from the first network 103 the other networks 107, 109 may send an offer message comprising an offer in the form of an offer vector ($BID_k$) which specifically may include the following information:

The amount of credit tokens offered per time unit ($CT_k$).
The fraction $x_k$ of the offered time the offer $CT_k$ applies to and/or,
The time interval $[T_{start\ k}, T_{End\ k}]$ to which the offer applies (where $[T_{start\ k}, T_{End\ k}] \subset [T_{Start}, T_{End}]$).

Thus the offer vector may specifically be denoted by $BID_k = \{CT_k, x_k, T_{start\ k}, T_{End\ k}\}$ Step 405 is followed be step 407 wherein a network may be selected to be temporarily allocated an air interface resource.

Specifically, the selection processor 207 may evaluate the received offers $BID_k$ as follows:

Based on the different offers received:
  The selection processor 207 may partition the offered time interval $[T_{Start}, T_{End}]$ into contiguous time segments $\{TS_i\}$ on the basis of the time intervals set $\{[T_{start\ k}, T_{End\ k}]\}$. Each $TS_i$ corresponds to a time window (integer number of $T_{Frame}$) in which a subset of intervals of $\{[T_{start\ k}, T_{End\ k}]\}$ completely overlaps. In each $TS_i$, each network k competes with his respective offer $BID_k$.

For each $TS_i$, the selection processor 207 calculates the payoff $P_k = CT_k * x_k * T_{Renting} * N_{Frame\ i}$ for each network k. $N_{Frame\ i}$ is the number of frames within $TS_i$ ($N_{Frame\ i} = TS_i / T_{Frame}$)

The selection processor 207 searches the subset of $\{k\}$ such that $sum(x_k) = 1$ and $sum(P_k)$ is maximised.

A clearing price auction value ($CPA_{i,k}$) is derived by the selection processor 207 for each $TS_i$ and each network k. $CPA_{i,k}$ is expressed as a number of credit tokens per time unit (CT).

For each network k of the selected list $\{k\}$ on $TS_i$, the combined resource exchange allowance reduction is determined as $Pr_k = CPA_{i,k} * x_k * T_{Renting} * N_{Frame\ i}$. Provided that $Pr_k$ does not exceed the resource exchange allowance (in terms of available credit tokens) for the networks, the selected networks are assigned the corresponding resources during the $x_k * T_{Renting}$ time unit of the time interval nominally allocated to the first network 103. The temporarily allocated time interval is allocated for $N_{Frame\ i}$ frames.

In the example, the selection processor 207 may thus select a plurality of networks to receive part of the available resource.

In the above described example, the temporarily allocated air interface resource comprises all the frequency carriers in the frequency band for a given time interval. This may facilitate resource sharing as the different networks are allocated disjoint time intervals and thus cross-interference between networks may be reduced.

However, in some embodiments, it may be practical to allocate resource in lower granularities and specifically it may be practical to only allocate a subset of frequency carriers in the frequency band. In such embodiments, transmissions over the air interface may simultaneously occur in different networks. These transmissions may interfere with each other and in some embodiments the selection processor 207 may therefore comprise functionality for determining a service impact on the different networks before re-allocating the source.

Specifically, the selection processor 207 may determine a service impact on services of the first network 103 and a second network 107 when a re-allocating resource from the first network 103 to the second network 107 is performed. Only if this service impact is acceptable will the temporary allocation of resource to the second network 207 be allowed.

As a specific example the quality of service levels for the first network 103 ($QoS_{Master}$) and the second network 107 ($QoS_{Slave}$) may be considered by the selection processor 207. In the example, the resource availability message transmitted by the sharing instigation processor 205 furthermore identifies a set of subcarriers which are available for temporary reallocation.

Based on this information, each candidate network 107, 111 monitors each subcarrier and measures the amount of co-channel interference experienced.

Based on these measurements, the candidate network 107, 111 (k=107, 111) assesses whether this interference level is acceptable in view of the required Quality of Service level $QOS_{Slave\ k}$. The $QOS_{Slave\ k}$ metric can be a noise rise criterion, a capacity (number of served users) criterion, etc.

The individual candidate networks 107, 111 identify the acceptable subcarriers in a list $id_k$ which is transmitted to the first network 103 in the offer message.

The first network 103 coordinates with the individual candidate network 107, 111 to enable the first network 103 to determine whether the additional co-channel interference generated by the individual candidate network 107, 111 for carriers included in $id_k$ is acceptable in view of the required quality of service for the first network 103 $QoS_{Master\ N}$.

If it is determined that both resulting Quality of Service levels are acceptable in view of the cross-interference, the offers from the candidate network is included in the evaluation and otherwise it is rejected.

Step 407 is followed by step 409 wherein resource allocation messages identifying the awarded air interface resource is transmitted to the individual networks 107, 111.

Step 409 is followed by step 411 wherein a resource exchange allowance message is transmitted to the resource exchange allowance processor 113. The resource exchange allowance message comprises an identification of the credit tokens which each network being allocated resource has offered for that resource.

In response, the resource exchange allowance processor 113 updates the stored values for the resource exchange allowances of the different networks 103, 107, 111. Specifically, it may reduce the networks 103, 107, 111 having been allocated air interface resource by the corresponding number of credit tokens.

In addition, the resource exchange allowance processor 113 may increase the resource exchange allowance of the first network 103 e.g. by the total number of credit tokens offered by the other networks in return for the allocated resource.

Thus the system may also provide the means to award networks 103, 107, 111 with additional resource exchange allowance in return for the sharing of their resource. This may provide an incentive for networks to share resource.

Specifically, a number of credit token awards CTA may be added to the resource exchange allowance of the first network 103 in accordance with the following specific example.

For an allocation of the entire frequency band, the $CTA_N$ granted to the first network 103 may be determined as a function of rented time $T_{Renting}$ over the time interval $[T_{start}, T_{End}]$ as follows:

$$CTA_N = w_{time}(t,s) * [T_{Renting} * (T_{End} - T_{start})/T_{Frame}]$$

where $w_{time}$ is a weight factor (scalar) that be can adjusted/tuned to control the number of awarded credit tokens per rented time duration. w is a function of time (t) and space (s) and it can therefore be dynamically adjusted as a function of e.g. the space time traffic intensity variations.

For an allocation of only a subset of carriers of the frequency band, the $CTA_N$ granted to the first network 103 may be determined as a function of rented time $T_{Renting}$ over the time interval $[T_{start}, T_{End}]$ the modified Quality of Service level of the first network 103 $QOS_{Experienced\ Master\ N}$, the modified Quality of Service level of the selected network $QOS_{Experienced\ Slave\ k}$, and the number of subcarriers rented $\{id_k\}$ to the selected networks $\{k\}$, as follows:

$$CTA_N = w_{time}(t,s) * [T_{Renting} * (T_{End} - T_{Start})/T_{Frame}] + w_{frequency}(t,s) * BW_{Rented} + W_{QoS\ Master}(t,s) * (QoS_{interference\ free\ Master\ N} - QOS_{Experienced\ Master\ N}) + w_{QoS\ Slave}(t,s) * [1/\Sigma(QoS_{Interference\ free\ Slave\ k} - QoS_{Experienced\ Slave\ k})]$$

where $w_{time}$ is a weight factor (scalar) that can be adjusted/tuned to control the number of awarded credit tokens per rented time duration.

$w_{frequency}$ is a weight factor (scalar) that can be adjusted/tuned to control the number of awarded credit tokens per rented bandwidth $BW_{Rented}$. $BW_{Rented}$ [$\Sigma$Card $(id_1 \cap \ldots \cap id_k \cap \ldots \cap id_Q)]*bw$. bw is the bandwidth of one subcarrier.

$w_{QoS\ Master}$ is a weight factor (scalar) that can be adjusted/tuned to control the number of awarded credit tokens as a function of the difference between (i) the QoS experienced ($QOS_{Interference\ free\ Master\ N}$) by the first network 103 when no sharing occurs (interference free period) and (ii) the degraded QoS experienced ($QOS_{Experienced\ Master\ N}$) by the first network 103 due to additional co-channel interference when sharing spectrum with selected networks. If the QoS criteria used by the first network 103 is the interference level, $QOS_{Experienced\ Master\ N} - QOS_{Interference\ free\ Master\ N}$ expresses the noise rise when co-channel spectrum sharing occurs.

$w_{QoS\ Slave}$ is a weight factor (scalar) that can be adjusted/tuned to control the number of awarded credit tokens as an inverse function of the difference between (i) the QoS experienced ($QoS_{interference\ free\ Slave\ k}$) by the selected network when no sharing occurs (interference free period) and (ii) the degraded QoS experienced ($QoS_{Experienced\ Slave\ k}$) by the selected network due to additional co-channel interference when sharing spectrum with the first network 103. If the QoS criterion used by the selected network is the co-channel interference level, $QoS_{Experienced\ Slave\ k} - QoS_{interference\ free\ Slave\ k}$ expresses the noise rise when spectrum sharing occurs.

$w_{time}$, $w_{frequency}$, $w_{QoS\ Master}$ and $w_{QoS\ Slave}$ are functions of time (t) and space (s) and therefore can be dynamically adjusted as a function of the space time traffic intensity variations.

It will be appreciated that other e.g. more complex and advanced algorithms may be used for selecting networks to which a resource may temporarily be allocated. For example, an iterative selection process comprising a plurality of resource exchange offer values being received from other networks may be used. As an example, the apparatus 201 may evaluate the received offers and then transmit a message to the other networks indicating what the current allocation is. This may result in other networks increasing the number of offered credit tokens which may be taken into account in the selection process.

Also, the selection process may be varied to suit the specific conditions of the networks. For example, depending on metrics like the number of networks sending offer messages for a given resource or the available time to make the transactions, different selection strategies can be supported by the selection processor 207. In particular, if time permits, multi-stage strategies (cooperative based multi round transactions) could be implemented to enable competing networks to negotiate by several iterations.

It will also be appreciated that the temporary resource allocation may not always be performed. For example, the selection processor 207 may be arranged to only allocate resource if the received resource exchange offer value is sufficiently high, e.g. only if the number of offered credit tokens is acceptable to the network providing the resource.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. An apparatus for resource sharing between a plurality of communication networks, the apparatus comprising:
   a network interface for interfacing with the plurality of communication networks, each of the plurality of communication networks having a nominal resource allocation of a shared air interface resource and a resource exchange value, wherein each of the plurality of communication networks are allocated nominal resources without consideration of how other networks are managing their nominal resource allocations;
      an initiating controller for initiating a temporary resource allocation of a first air interface resource from a nominal resource allocation of a first network of the plurality of communication networks;
      a receiver for receiving offer messages from at least one network of the plurality of communication networks; each offer message from each of the at least one network comprising a resource exchange offer value from its resource exchange allowance for at least part of the first air interface resource of the first network;
      a selection processor for selecting a second network in response to the received resource exchange offer values;
      a transmitter for sending a resource allocation message to the second network, the resource allocation message indicating a temporary allocation of at least part of the first air interface resource from the nominal resource allocation of the first network to the second network; and
      a processor for reducing the resource exchange allowance of the second network by a value determined in response to the resource exchange offer value from the second network; and
   the processor for increasing a resource exchange allowance of the first network by the value determined in response to the resource exchange offer value of the second network.

2. The apparatus of claim 1 wherein the initiating controller is arranged to initiate the temporary resource allocation in response to a determination of an available resource of the nominal resource allocation for the first network.

3. The apparatus of claim 1 wherein the initiating controller is arranged to initiate the temporary resource allocation in response to a determination of a resource requirement for the second network.

4. The apparatus of claim 1 wherein the selection processor is arranged to select the second network in response to a determination that the resource exchange offer value from the second network for the at least part of the first air interface resource is the highest received resource exchange offer value.

5. A communication system comprising a plurality of communication networks, the communication system comprising:
   a network interface for interfacing with the plurality of communication networks, each of the plurality of communication networks having a nominal resource allocation of a shared air interface resource and a resource exchange allowance, wherein each of the plurality of communication networks are allocated nominal resources without consideration of how other networks are managing their nominal resource allocations;
   an initiating controller for initiating a temporary resource allocation of a first air interface resource from a nominal resource allocation of a first network of the plurality of communication networks;
   a receiver for receiving offer messages from at least one network of the plurality of communication networks, each offer message from each of the at least one network comprising a resource exchange offer value from its resource exchange allowance for at least part of the first air interface resource of the first network;
   a selection processor for selecting a second network in response to the received resource exchange offer values;
   a transmitter for sending a resource allocation message to the second network, the resource allocation message indicating a temporary allocation of at least part of the first air interface resource from the nominal resource allocation of the first network to the second network;
   a processor for reducing the resource exchange allowance of the second network by a value determined in response to the resource exchange offer value from the second network; and the processor for increasing a resource exchange allowance of the first network by the value determined in response to the resource exchange offer value of the second network; and a transceiver in the second network, for communicating using the at least part of the first air interface resource.

6. The communication system of claim 5 further comprising means for storing the resource exchange allowances of the plurality of communication networks, and wherein the means for reducing the resource exchange allowance of the second network is arranged to transmit a message comprising the resource exchange offer value of the second network to the means for storing, and the means for storing is arranged to update the resource exchange allowance for the second network in response to the message.

7. A method of resource sharing between a plurality of communication networks, the method comprising:

interfacing, by a network interface, with the plurality of communication networks, each of the plurality of communication networks having a nominal resource allocation of a shared air interface resource and a resource exchange allowance, wherein each of the plurality of communication networks are allocated nominal resources without consideration of how other networks are managing their nominal resource allocations;

initiating, by an initiating controller, a temporary resource allocation of a first air interface resource from a nominal resource allocation of a first network of the plurality of communication networks;

receiving, by a receiver, offer messages from at least one network of the plurality of communication networks, each offer message from each of the at least one network comprising a resource exchange offer value from its resource exchange allowance for at least part of the first air interface resource of the first network;

selecting, by a selection processor, a second network in response to the received resource exchange offer values;

sending, by a transmitter, a resource allocation message to the second network, the resource allocation message indicating a temporary allocation of at least part of the first air interface resource from the nominal resource allocation of the first network to the second network; and reducing, by a processor, the resource exchange allowance of the second network by a value determined in response to the resource exchange offer value from the second network; and increasing, by the processor, a resource exchange allowance of the first network by the value determined in response to the resource exchange offer value of the second network.

* * * * *